J. M. ROSEBROOK.
Harvester.

No. 165,368.

3 Sheets--Sheet 1.

Patented July 6, 1875.

Witnesses.
Alex Mahon
H. C. Barclay

Inventor.
John M. Rosebrook
by A. M. Smith
Attorney

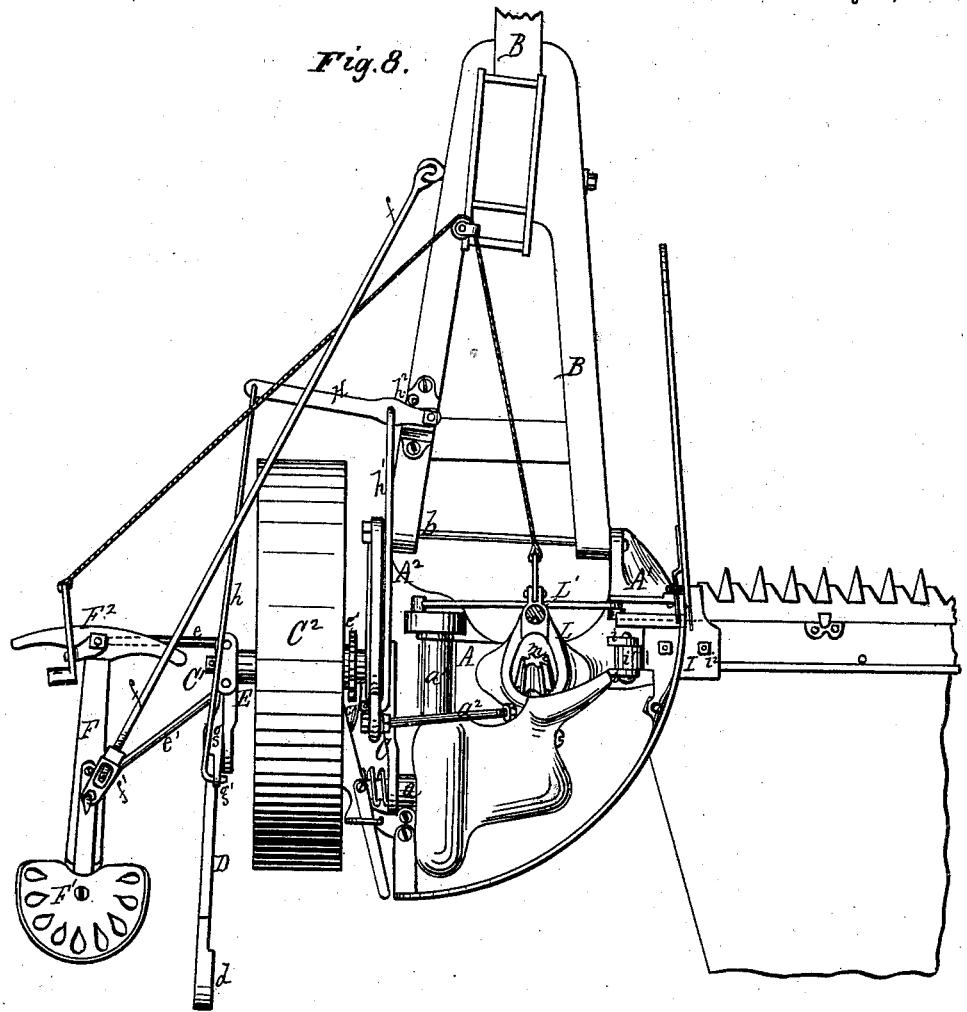

J. M. ROSEBROOK.
Harvester.

No. 165,368.

3 Sheets--Sheet 3.

Patented July 6, 1875.

UNITED STATES PATENT OFFICE.

JOHN M. ROSEBROOK, OF HOOSICK FALLS, NEW YORK, ASSIGNOR TO WALTER A. WOOD MOWING AND REAPING MACHINE COMPANY, OF SAME PLACE.

IMPROVEMENT IN HARVESTERS.

Specification forming part of Letters Patent No. 165,368, dated July 6, 1875; application filed November 25, 1874.

*To all whom it may concern:*

Be it known that I, JOHN M. ROSEBROOK, of Hoosick Falls, county of Rensselaer, State of New York, have invented certain new and useful Improvements in Reaping-Machines, of which the following is a full, clear, and exact description, reference being had to the accompanying drawings, making part of this specification, in which—

Figure 1:
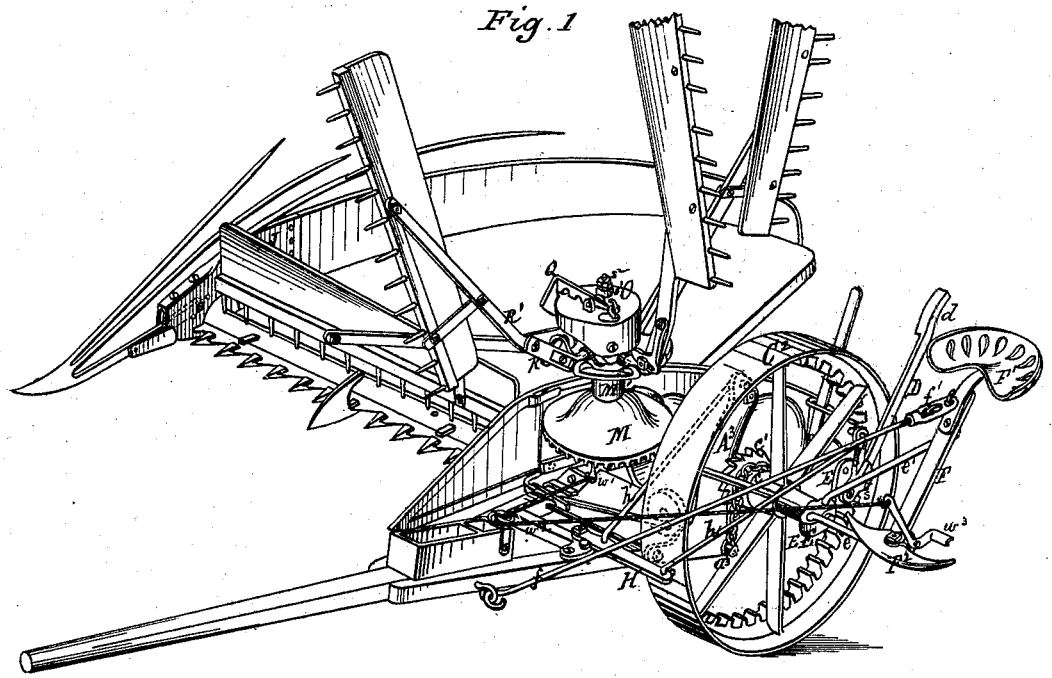
Figure 2:
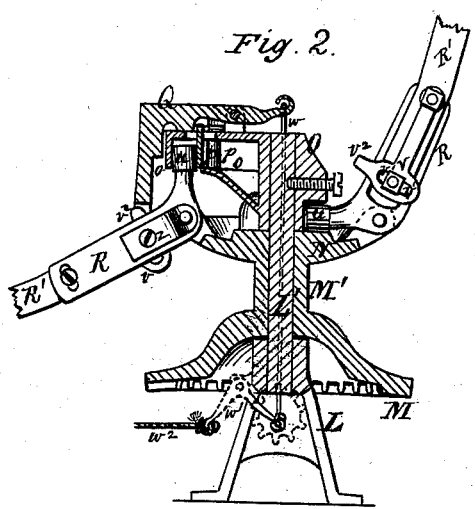
Figure 3:
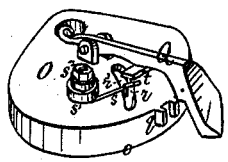
Figure 4:
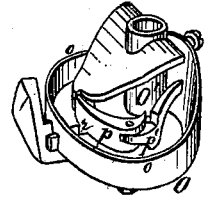
Figure 5:
Figure 7:
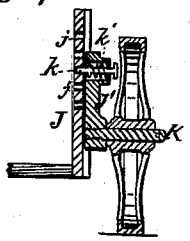
Figure 6:
Figure 9:
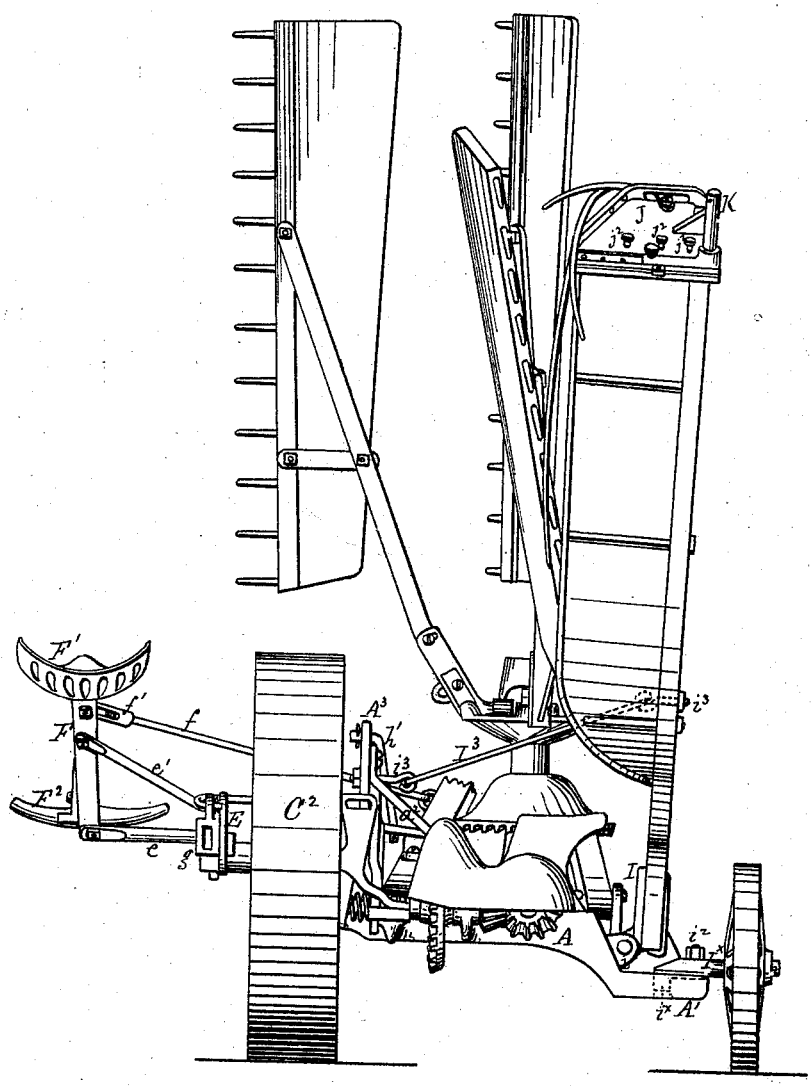

Figure 1 is a perspective view of the improved machine. Fig. 2 is a vertical section through the rake-standard and pivot. Fig. 3 is a perspective view of the rake cam-plate and tripper. Fig. 4 is a bottom perspective view of the same, showing the latch or gate. Fig. 5 is a perspective view of the heel-plate or elbow of the rake and reel arms. Fig. 6 is a perspective view of the lifting-lever detached. Fig. 7 represents a vertical section through the grain-wheel and divider-board, showing the arrangement of the connecting devices. Fig. 8 is a plan or top view with the rakes removed, and Fig. 9 is a rear elevation of the machine with the parts in position for transportation.

Similar letters of reference denote corresponding parts wherever used.

The invention relates more particularly to that class of reaping-machines known as one-wheel reapers, in which a single driving-wheel is used; but it will be obvious that several of the features of my improvement hereinafter described will be equally applicable to other organizations of reaping-machines. The invention consists, first, in a novel arrangement of devices for effecting the adjustment of the main frame and platform upon the main ground and drive wheel. It further consists in a novel construction and arrangement of devices for controlling the path of the rake and reel arms in passing over the platform; and, lastly, in certain details of construction and arrangement, hereinafter fully set forth.

In the drawings, A represents the main frame of the machine, made in form substantially as shown in Fig. 8, and consisting of a light angle-iron bar or casting, arranged, in the direction of its greatest length, transversely to the path of the machine, and provided on its outer or drive-wheel side with sleeves $a\ a'$, in which the pinion and crank shafts are mounted. The inner end of this frame is made drooping, and has the shoe $A^1$, to which the inner end of the cutting apparatus is connected, cast in one piece with it, the point or toe of said shoe or runner reaching forward and upward into the same horizontal and vertical transverse planes, with the forward end of an arm, $A^2$, on the outer end of the frame-bar A, and forming, in connection with said arm $A^2$, the point of pivotal connection of the tongue B, as shown at $b$, Fig. 8. The frame-bar has arms also upon its rear face, provided with sleeve-bearings for the pinion and bevel-wheel shaft, the outer one of these (shown at $a$) extending beyond the outer edge or face of the frame, and forming the pivotal center and support for a vibrating sector-plate or arm, C, which, near its forward end has the outwardly-projecting axle $C^1$, upon which the drive-wheel $C^2$ is mounted, rigidly attached. The forward face or end of this arm C, which is made in the arc of a circle of which the pinion-shaft is the center, is grooved vertically, and moves up and down, guided by a curved standard, $A^3$, rigidly connected with the arm $A^2$ of the frame. The upper end of this standard is braced against lateral strain by a rod or brace, $a^2$, connecting it with the main frame or with the rake-stand, as shown in Fig. 8.

Upon the axle $C^1$, between the drive-wheel $C^2$ and the arm C, is mounted a windlass, $c$, which is free to turn on the axle, and from the barrel or cylinder of which a chain, connected thereto at one end, extends downward, and has its lower end connected with a stud, $a^3$, on the outer face of the frame A. (See Fig. 1.) One end of this barrel or windlass has a toothed disk or ratchet-wheel, $c'$, rigidly connected with it, with which a weighted pawl, $c^x$, pivoted on a stud on arm C, engages for holding the windlass at any desired point of adjustment. D, Fig. 6, represents a lever, curved at one end, $d$, and grooved or recessed longitudinally on its concave face, said grooved end matching the toothed face or edge of the windlass-disk $c'$, and enabling the driver to rotate the windlass $c$ for elevating the frame, the pawl $c^x$ engaging with the ratchet-teeth, and holding the frame at any desired point of adjustment. The frame may be lowered by simply disengaging the weighted pawl from the toothed disk. Outside of the wheel $C^2$, on the axle $C^1$, is mounted loosely an arm, E, provided at its rear upper end with a notched or perforated quadrant, and in front and rear of its horizontal axle-sleeve or socket with vertical perforations, for the reception of the inner ends of two angular braces, $e\ e'$, the outer ends of which support the seat-standard and seat F $F^1$, from the former of which, F, near its upper end, a brace, $f$, extends forward, and is connected with the tongue-frame, said brace being made adjustable in length by means of a screw-thread and adjustable link at $f'$, and serving to hold the seat-standard at any desired angle of inclination to the ground. The bottom of the standard has secured to it a stirrup-piece or foot-rest, $F^2$, for the driver sitting in seat $F^1$.

To the outer face of the arm E, in rear of and above the axle, a lever-plate, $g$, is pivoted at its lower end by means of a longitudinally-yielding spring-pivot, which serves to hold the plate $g$ snugly against the arm E, with a retaining-pin on its inner face engaged with one of a series of perforations or notches in its quadrant end. Upon the forward upper face of this plate is a lever-arm, $g'$, which is connected by a link, $h$, with the outer end of a lever-arm, H, which, at its opposite end, is pivoted to the pole-frame, and at a point outside of said pivot, and between the pivot and link $h$, is connected, by a rear brace, $h'$, with the upper end of the standard $A^3$. The lever-plate $g$, in rear of the arm $g'$, has a socket formed in it for the reception of the end $d'$ of the lever $d$, Fig. 6, which, for convenience of manipulation, may be set at any desired angle of inclination (see Fig. 1) by the adjustment of the lever-plate $g$ relatively to the quadrant, as above explained.

It will be seen that a backward or forward movement of the lever D in this arrangement vibrates the lever-arm H, and this in turn, acting upon the standard $A^3$ through the link $h'$, rocks the main frame on the ground-wheel C, and changes the angle of the cutting apparatus, which is located about in the same transverse line with the tread of said wheel C, for adapting said cutting apparatus to pick up fallen grain, or to pass over rough or stony ground, as required.

The shoe $A^1$ on the main frame has a socket formed in its upper face for the reception of the heel end of the finger-bar and heel-plate I, and at the heel end of said bar are lugs or ears $i\ i$, between which a corresponding ear, $i^1$, on the heel-plate I, is hinged, said heel-plate having a socket on its lower face, in which the heel of the finger-bar is firmly bolted, the object being to make the connection rigid in operation, this being effected by means of a bolt, $i^2$, passing through the heel-plate I, and through the finger-bar and shoe, and securing the said finger-bar firmly to the rigid shoe $A^1$.

For transportation from field to field, the bolt $i^2$ is removed, and the finger-bar, together with the platform, is folded on its hinge into a vertical position, (see Fig. 9,) one of the rake-arms hereinafter described being removed to permit this, and there held by a link-rod, $I^3$, provided at each end with an eye-jointed bolt, $i^3$, one of which passes through a perforation in the standard A, and is held by a nut, and the other of which is secured in a similar manner to the finger-bar, as shown. This done, an axle-plate, $I^x$, may be bolted to the shoe in the finger-bar socket by the bolt $i^2$, a spur, $i^x$, at the rear end of said plate fitting into a square perforation in the shoe formed for the reception of the head of one of the bolts which fastens the finger-bar to the heel-plate. The grain-wheel, hereinafter referred to, is then removed from the outer divider-board of the platform and placed upon the axle of this plate $I^x$, and a pin, $h^2$, is placed in the tongue in front of the lever H, making the connection between the tongue and tongue-frame practically rigid, when the machine can be readily drawn from place to place.

Under any adjustment of the cutting apparatus, either for operation or for transportation, the shoe itself remains rigid, a part of the frame causing the inner end of the cutting apparatus to ride readily and easily over dead furrows or other obstructions, and when the cutting apparatus is folded for transportation, as described, the shoe may still serve as a runner, while it also acts as a guard to protect the lower or heel end of the cutters from injury.

The pin $h^2$ is not necessarily used except when the seat-standard is removed for enabling the machine to pass through gateways and narrow passages.

For effecting the adjustment of the outer end of the cutting apparatus and platform, the divider-board J is provided on its outer face with a vertical groove, dovetail in form, in horizontal section, in which a slide, $J^1$, plays, to the lower end of which the grain-wheel axle K is secured. In the upper end of the slide $J^1$ is formed a socket for the reception of a sliding bolt or pin, $k$, around which, within the socket, is placed a spring, $k'$, its outer end resting against the end web of the socket, and its inner against a shoulder or pin on the sliding bolt, in such manner that the tension of the spring serves to force the bolt $k$ inward into one of a series of perforations, $j$, formed in the divider-board for its reception. A button or head formed on the outer end of the sliding spring-bolt $k$ enables the attendant to readily withdraw the pin for adjusting the height of the outer end of the cutting apparatus to conform to the adjustment of the inner end, this adjustment being effected by the use of the lever D, the small end of which is passed from the rear over the axle K as a fulcrum, and underneath one of a series of studs or pins, $j^2$, on the divider-board, when, the sliding spring-pin $k$ being withdrawn, the outer end of the platform may be raised or lowered, as required.

Upon the main frame or bar A, near midway of its transverse length, is bolted the stand L, made in the form of an inverted Y in vertical cross-section, (see Fig. 2,) its upper face in rear of the vertical rake-shaft L' being open, as shown in Fig. 8, around the bevel-pinion $m$, which works through said opening for driving the crown or bevel wheel M on the rake-shaft. An inclined sleeve in the upper portion of the casting L, in rear of the opening for the pinion $m$, affords bearings for the shaft of said pinion, the shaft being operated through a bevel-wheel on its rear end, meshing with a bevel-pinion on the pinion-shaft. In the forward end of this irregular Y-shaped rake-standard L is rigidly secured the rake-shaft L', and upon this shaft, its lower face resting on the upper end of standard L, is mounted the crown or bevel wheel M, the sleeve M' of which has the rake-head N cast upon or rigidly secured to it. Above this rake-head, on the shaft L', is secured the eccentric cam-plate O, (shown detached in Figs. 3 and 4,) through which the rising and falling movements are imparted to the rake and reel arms. On the under side of this cam O, midway between the rake-shaft sleeve O' and the vertical cam-rim or flange $o$ on its periphery, is a latch or gate, $p$, pivoted in rear of the middle of its length, and provided at or near its forward tapering end on its upper edge with a spur, $r$, which projects upward through a slot at $r'$ in the cam-plate, made in the arc of a circle, of which the latch-pivot is the center. The latch or gate $p$ approaches a crescent form, its ends curving inward each side of its pivot, and its rear end is forked to receive a tail-piece, $p'$, hinged by its forward end to the same pivot which connects the latch $p$ with the cam-plate, said tail-piece forming an extension of the gate, for transferring the heel of the rake arm or elbow, after it has passed over the latch $p$, back again to its usual track. The spur $r$ on the forward end of the latch or gate $p$ projects above the upper face of the cam-plate, and has one end of a spring, $s$, pressing against its inner face, the opposite end of said spring being held by an adjustable washer, $s^1$, held in place by a nut, $s^2$, on the upper end of the same bolt which forms the pivot of latch or gate $p$. The fixed bent end of this spring passes through a slot or perforation in the washers, and the adjustment of the latter regulates the force of the spring $s$, the tension of which is exerted for holding the spur at the outer end of the slot $r'$, with the gate $p$ in position to cause the rake-heads to act as beaters or gatherers only. Q is a weighted tripper-latch, pivoted near its inner end to lugs or ears on the cam-plate, with its outer weighted end overhanging the cam-plate, and provided on said overhanging end with an inclined cam-face, for a purpose which will be explained. A lip or flange on the inner face or edge of the overhanging end engages with lugs $q$ on the outer face of the cam-plate, which prevent the backward thrust of the tripper. Midway of the length of the weighted arm of the tripper is a dog or spur, $t$, which, when the rake and reel arms move in the path required for causing the heads to act as rakes for removing the grain from the platform, drops down upon the cam-place outside the spur $r$ on the gate $p$, locking the gate in the required position for that purpose, as follows: The roller $u$ on the heel ends of the rake-arms, when the latter act as beaters or gatherers only, in passing through the track between the sleeve O' and the gate $p$, strike against the curved heel-end of the latter, and, forcing it outward, force the forward end or point of said gate inward, overcoming the tension of the spring $s$, until the dog or spur $t$ drops down outside the spur $r$ on said gate, locking the gate in the required position to cause the succeeding rake-rollers to traverse the path outside the gate $p$, and between said gate and the rim $o$, where it remains until released by the action of the rake-arm on the outer cam end of the tripper, or by the attendant, the rake and reel arms, in the meantime, all acting as rake-arms.

For releasing the gate automatically the rake-arms R are provided with adjustable plates $v$, made by preference in the T form shown in Fig. 2, with the end pivoted and the cross-head slotted, as at $v^1$, and held by a nut and bolt, which permit the adjustment of the slotted end in such manner that the upwardly-projecting end or spur $v^2$ may be made to come in contact with the inclined cam end of the tripper Q, for raising the same and releasing the gate $p$, which will be immediately thrown outward by the tension of the spring $s$.

For releasing the tripper by hand, its inner short end has a rod or wire, $w$, connected with it, which extends downward through a groove in the fixed shaft L, and has its lower end connected with one end of a bell-crank lever, $w^1$, pivoted to a lug on the rake-standard, the opposite end of said lever having a cord, $w^2$, connected with it, which extends forward and around a pulley on the tongue-frame, and thence to a treadle pivoted at or near the foot of the driver's-seat standard, and by pressing upon which treadle the driver can release the gate $p$, and cause the rakes to act as gatherers or beaters only.

By this arrangement, it will be seen that the plates or spurs $v$ on the rake and reel arms may be so set that one, two, or more of their number will act as rake-arms automatically, and that when so set said arms may still, at the option of the attendant, be made to act as gatherers or beaters only; that all may be so set to act as rakes, when desired, for delivering the grain in a swath, and the driver still enabled to cause them all to act as beaters as long as required by simply pressing with his foot on the treadle $w^3$.

The rake arm or elbow R is cast in one piece, with a pivotal spur, $x$, on one side, together with a socket upon one side for the reception of the heel end of the rake-stale R', and with a slot at its outer end, permitting the adjustment of the angle of relation of said stale, as shown. Upon the opposite side of this elbow R is formed a socket for the reception of an angular plate, $y$, on which is cast the opposite pivotal spur $x'$, the construction being such that, after the elbow is inserted in the socket, the plate $y$ may be inserted at an angle thereto for entering the pivot $x'$ in the socket in the rake-head for its reception, after which the plate is pressed into its socket in arm R, where it may be secured by the same through-bolt $z$ which permits the adjustment of the tripping spur-plate $v$. The outer pivotal end of this plate $v$ may also be held to the arm R by the same bolt which connects the rake-stale to said arm, if desired.

Parts of the machine not specifically described above may be constructed in any usual or preferred manner.

Having thus described my invention, what I claim as new, and desire to secure by Letters Patent, is—

1. The driving-wheel mounted on an axle connected with the vibrating sector plate or arm, in combination with the windlass, arranged on said axle for adjusting the height of the main frame, and operating substantially as described.

2. The seat and lever plate or arm E, mounted on the drive-wheel axle, and combined with the main and pole frames by means of the sector-plate, and the links $h\ h'$, and lever H, substantially as and for the purpose described.

3. The removable lever D, provided with the socket $d$, whereby it is adapted to rotate the windlass for elevating the frame, as described.

4. The heel-plate I, to which the finger-bar is bolted, hinged to the rigid shoe $A^1$, in combination with the through-bolt $i^2$, whereby the cutting apparatus can be either rigidly connected with the shoe, or folded up on its hinge connection therewith for transportation, as described.

5. The eccentric cam-plate O, with its inverted cam-rim and pivoted gate $p$ applied to the upper end of the rake-pivot, in combination with the upwardly-projecting heel-extensions of the rake and reel arms, substantially as described.

6. The latch Q, arranged over the cam-plate O, in combination with the hollow or grooved axle or rake-shaft, and the tripping cord or wire passing through said shaft, substantially as described.

7. The rake arm or elbow R, provided with the socket for the reception of the rake-stale, and the slot and through-bolt, permitting the adjustment of the same, and with the removable pivot-plate $y$ applied thereto, and operating as described.

JOHN M. ROSEBROOK.

Witnesses:
A. C. EDDY,
A. T. SKINNER.